United States Patent
Matsumaru et al.

(10) Patent No.: US 10,802,270 B2
(45) Date of Patent: Oct. 13, 2020

(54) OPTICAL SCANNER COMPRISING A CALIBRATING UNIT TO CALIBRATE INTENSITY OF THE DRIVE SIGNAL APPLIED TO A MIRROR DRIVING UNIT

(71) Applicant: STANLEY ELECTRIC CO., LTD., Meguro-ku, Tokyo (JP)

(72) Inventors: Naoya Matsumaru, Tokyo (JP); Kenji Nagashima, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 189 days.

(21) Appl. No.: 16/222,154

(22) Filed: Dec. 17, 2018

(65) Prior Publication Data

US 2019/0187459 A1    Jun. 20, 2019

(30) Foreign Application Priority Data

Dec. 18, 2017  (JP) ................................ 2017-241932
Dec. 18, 2017  (JP) ................................ 2017-241933

(51) Int. Cl.
*G02B 26/10* (2006.01)
*G01J 1/04* (2006.01)
*G01J 1/02* (2006.01)

(52) U.S. Cl.
CPC .......... *G02B 26/105* (2013.01); *G01J 1/0295* (2013.01); *G01J 1/0403* (2013.01)

(58) Field of Classification Search
CPC ............. G02B 26/101; G02B 26/0833; G02B 26/0858; G02B 26/105; G01S 7/4817; G01S 7/497; G01J 1/0403
USPC ................................... 250/235, 214 R, 559.1
See application file for complete search history.

(56) References Cited

U.S. PATENT DOCUMENTS 5,185,676 A * 2/1993 Nishiberi ............. G02B 26/101
                                                      359/202.1

FOREIGN PATENT DOCUMENTS

JP          2008298686 A       12/2008

* cited by examiner

*Primary Examiner* — Que Tan Le
(74) *Attorney, Agent, or Firm* — Holtz, Holtz & Volek PC (57) ABSTRACT

Provided is an optical scanner including: a mirror driving unit which drives a scanning mirror which reflects light from a light source based on a drive signal; an optical sensor which detects scanning light entering first and second detection positions set on both sides of a range of the maximum scan angle within the range; and a calibrating unit which calibrates the intensity of the drive signal based on the time point at which the detection is performed and the frequency and intensity of the drive signal.

10 Claims, 5 Drawing Sheets

FIG.7

OPTICAL SCANNER COMPRISING A CALIBRATING UNIT TO CALIBRATE INTENSITY OF THE DRIVE SIGNAL APPLIED TO A MIRROR DRIVING UNIT

BACKGROUND OF THE INVENTION

1. Field of the Invention

The present invention relates to an optical scanner having a function of calibrating intensity of a drive signal.

2. Description of the Related Art

Conventionally, there has been known an optical scanner that includes a scanning mirror which reflects a laser beam coming from a light source and a drive mechanism which drives the scanning mirror so as to reciprocatingly rotate and that performs scanning with the laser beam (refer to Patent Literature 1).

This optical scanner includes a reverse side mirror which turns in accordance with the turn of the scanning mirror and a light source for a servo which emits servo beam. This optical scanner irradiates the reverse side mirror with the servo beam and detects the reflected light of the servo beam by using a light spot position sensor such as a position sensitive detector (PSD) to monitor a scanning range with a laser beam.

CITATION LIST

Patent Literature

Patent Literature 1: Japanese Patent Application Laid-Open No. 2008-298686.

According to the optical scanner described in the aforementioned Patent Literature 1, monitoring the scanning range with the laser beam requires the light source for a servo and the reverse side mirror in addition to the light source for scanning, thereby complicating the device configuration.

Furthermore, in the case where the optical scanner is configured using a digital micromirror device as micro electro mechanical systems (MEMS) for a scanning mirror, the scanning mirror is configured as a double-sided mirror having a reverse side mirror. Therefore, the mass of the scanning mirror increases, which leads to an increase in the electric power for driving the scanning mirror or a decrease in the scanning performance.

In addition, the above optical scanner has a complicated device configuration in comparison with a normal optical scanner not having a light source for a servo or the like, thereby causing a necessity for using a special packaging structure suitable for the device configuration as a packaging structure for dust-proof and moisture-proof measures.

Accordingly, in the case of calibrating the intensity of a drive signal in an optical scanner so as to obtain an appropriate scan angle by using a monitor function of a scanning range of the optical scanner in Patent Literature 1, it is unable to avoid complication of the device configuration, performance degradation, and an increase in power consumption.

SUMMARY OF THE INVENTION

In view of the above problem of the conventional technique, an object of the present invention is to provide an optical scanner capable of calibrating the intensity of the drive signal with a simple configuration without any trouble.

According to an aspect of the present invention, there is provided an optical scanner including: a light source; a scanning mirror which reflects and scans light from the light source; a mirror driving unit which is able to drive the scanning mirror so as to perform a rotational simple harmonic motion based on a supplied drive signal; a scanning light detecting unit which detects scanning light entering a first detection position and a second detection position set on both sides of a range of a maximum scan angle of the scanning light from the scanning mirror within the range; and a calibrating unit which calibrates intensity of the drive signal applied to the mirror driving unit based on a time point, at which the scanning light detecting unit detects that the scanning light from the scanning mirror has entered the first detection position and the second detection position due to the simple harmonic motion of the scanning mirror caused by the drive signal, and the frequency and intensity of the drive signal.

If the scanning mirror is driven for a long period of time in the above optical scanner, the maximum scan angle decreases according to an elapse of the drive time. Therefore, to maintain a constant maximum scan angle, the intensity of the drive signal is required to be calibrated so as to increase gradually according to an elapse of the drive time.

In the present invention, the drive signal is calibrated focusing on that there is a certain relationship between the time point at which the scanning light enters the first detection position and on the second detection position due to a simple harmonic motion of the scanning mirror, the frequency and intensity of the drive signal, and the maximum scan angle. Specifically, the calibrating unit calibrates the intensity of the drive signal so that an expected certain maximum scan angle is maintained based on the entering time point and the frequency and intensity of the drive signal.

In addition, according to the present invention, the main hardware configuration does not require a light source for a servo and a reverse side mirror as has been conventional, but the intensity of the drive signal can be calibrated appropriately only by the provision of a scanning light detecting unit which detects scanning light entering the first and second detection positions. Therefore, the intensity of the drive signal is able to be calibrated appropriately with a simple configuration while avoiding the complication and performance degradation of the optical scanner and an increase in power consumption thereof.

In the present invention, preferably the scanning light detecting unit includes an optical sensor which detects the scanning light entering the first detection position and the second detection position; and the calibrating unit generates an amplified signal by amplifying a detection signal from the optical sensor so as to be in a saturated state and determines the time point, at which the scanning light detecting unit detects that the scanning light entered the first detection position or the second detection position, based on a change in intensity of the amplified signal.

According thereto, a change in time relative to a change in voltage is smaller than for the signal before amplification with respect to a waveform of the amplified signal saturated by amplifying the detection signal from the optical sensor. Therefore, the present invention is able to determine the time point at which the scanning light detecting unit detects that the scanning light entered the first detection position or the second detection position with high accuracy. Thereby, the intensity of the drive signal can be calibrated with high accuracy.

In the present invention, preferably the calibrating unit adjusts a gain for amplifying the detection signal according to rise or fall time of the amplified signal.

According thereto, the adjustment of the gain for amplifying the detection signal according to the rise or fall time enables the rise or fall time of the amplified signal to be more appropriate. Thereby, accurate identification of the time points at which the scanning light enters the first and second detection positions can be reliably performed, which improves the accuracy of the calibration without fail.

In the present invention, preferably the calibrating unit includes; a maximum scan angle acquisition unit which acquires the maximum scan angle based on the time point at which the scanning light detecting unit detects and the frequency of the drive signal at the detected time point; and a calibration value acquisition unit which obtains a calibration value of the intensity of the drive signal applied to the mirror driving unit based on the maximum scan angle acquired by the maximum scan angle acquisition unit and the intensity of the drive signal at the detected time point.

According thereto, the calibration value of the intensity of the drive signal causing a certain maximum scan angle has a certain relationship with the maximum scan angle and the intensity. Therefore, the calibration value acquisition unit is able to find the calibration value of the intensity from the maximum scan angle acquired by the maximum scan angle acquisition unit and the intensity of the drive signal at the acquisition by utilizing the relationship.

In the above, the time point at which the scanning light detecting unit detected that the scanning light entered the first detection position or the second detection position is determined with high accuracy based on a change in the intensity of the aforementioned amplified signal as described above. Therefore, the calibration value can be acquired with high accuracy.

In this case, the maximum scan angle acquisition unit may acquire the maximum scan angle (2A) based on: a time period $\Delta ta0$ from a time point t4 at which the scanning light entered the first detection position once to a time point t5 at which the scanning light entered the first detection position again and a time period $\Delta ta1$ from the time point t5 at which the scanning light entered the first detection position again to a time point t6 at which the scanning light entered the first detection position further again; a time period $\Delta tb0$ from a time point t1 at which the scanning light entered the second detection position once to a time point t2 at which the scanning light entered the second detection position again and a time period $\Delta tb1$ from the time point t2 at which the scanning light entered the second detection position again to a time point t3 at which the scanning light entered the second detection position further again; an angle ($\theta a+\theta b$) formed between the scanning light entering the first detection position and the scanning light entering the second detection position; and a frequency $\omega$ of the drive signal.

According thereto, the maximum scan angle acquisition unit is able to easily calculate and find the maximum scan angle (2A) based on the aforementioned time periods $\Delta ta0$, $\Delta ta1$, $\Delta tb0$, and $\Delta tb1$, angle ($\theta pa+\theta Pb$), and frequency $\omega$.

In the above, the time points (t1 to t6) at which the scanning light detecting unit detected that the scanning light entered the first detection position or the second detection position based on a change in the intensity of the aforementioned amplified signal with high accuracy as described above. Therefore, the maximum scan angle (2A) can be acquired with high accuracy.

In the present invention, preferably the scanning light detecting unit includes an optical sensor, and a light guide unit which guides the scanning light entering the first detection position and the second detection position to the optical sensor.

According thereto, only the use of one optical sensor enables the detection of the scanning light entering the first detection position and the second detection position.

In this case, preferably the light guide unit is arranged at the first detection position and in the second detection position and has a reflective surface on which the scanning light from the scanning mirror is reflected toward the optical sensor. According thereto, the light guide unit is able to be simply configured.

Alternatively, the light guide unit may include a slit provided at each of the first detection position and in the second detection position and an optical element which guides the scanning light entering from the scanning mirror on each slit to the optical sensor.

According thereto, the light guide unit is able to be provided by utilizing a space on the side opposite to the incident side of the scanning light on each slit.

In this case, preferably the optical scanner includes a scanning light reflection mirror which reflects the scanning light from the scanning mirror, wherein the slits are provided in the scanning light reflection mirror.

According thereto, the scanning light entering the first detection position and the second detection position can be detected by utilizing the space on the back side of the scanning light reflection mirror.

In this case, the scanning light reflection mirror may be a curved mirror formed of a curved surface or a scanning light reflection mirror which corrects a distortion of the scanning light.

DESCRIPTION OF THE PREFERRED EMBODIMENTS

Hereinafter, preferred embodiments of the present invention will be described with reference to appended drawings.

Figure 1:
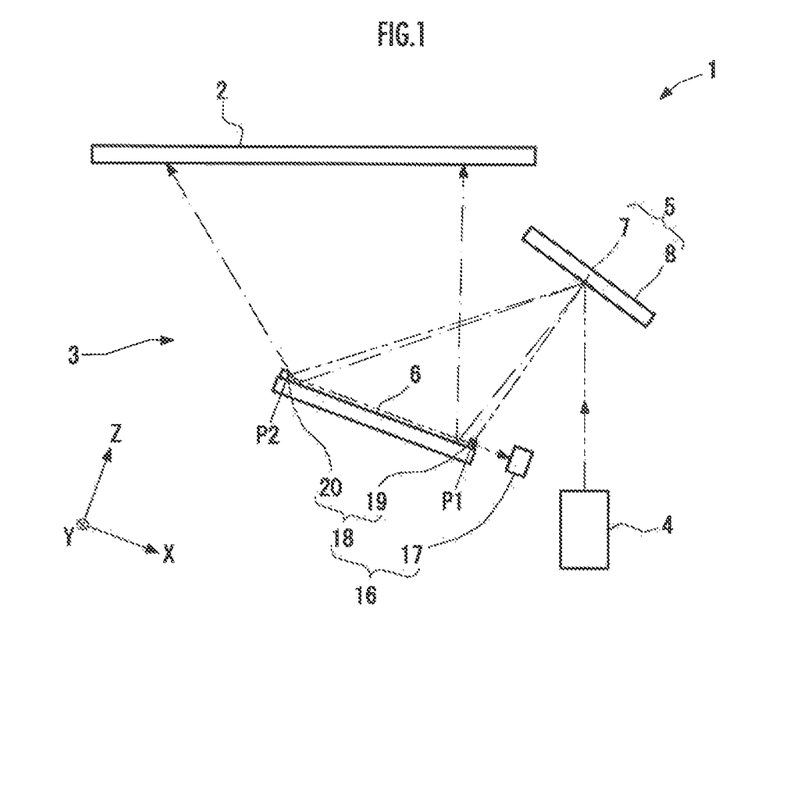
FIG. 1 is a side view illustrating the main part of a projector having an optical scanner according to one embodiment of the present invention.

FIG. 1 illustrates the main part of a projector having an optical scanner according to one embodiment.

As illustrated in FIG. 1, the projector 1 includes a screen 2 and an optical scanner 3 which irradiates the screen 2 with scanning light. The optical scanner 3 includes a light source 4, a deflector 5 which reflects and deflects light emitted from the light source 4, and a scanning light reflection mirror 6 which reflects the scanning light coming from the deflector 5 toward the screen 2. The scanning light reflection mirror 6 may be a mirror having a flat surface, but also may be a curved mirror formed of a curved surface or may be a correction mirror which corrects distortion of scanning light.

Figure 2:
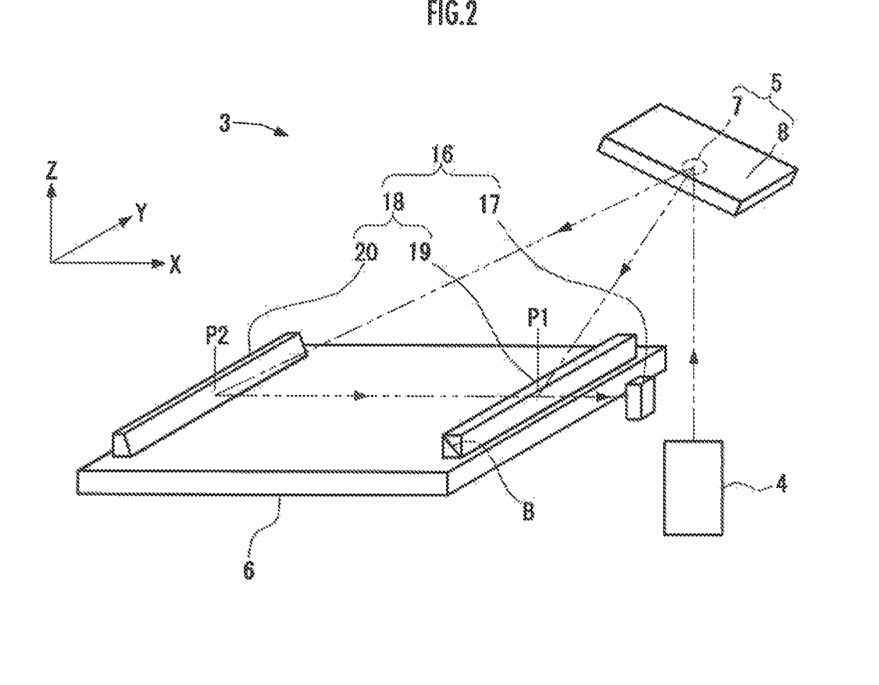
FIG. 2 is a perspective view illustrating the optical scanner of the projector illustrated in FIG. 1.
Figure 3:
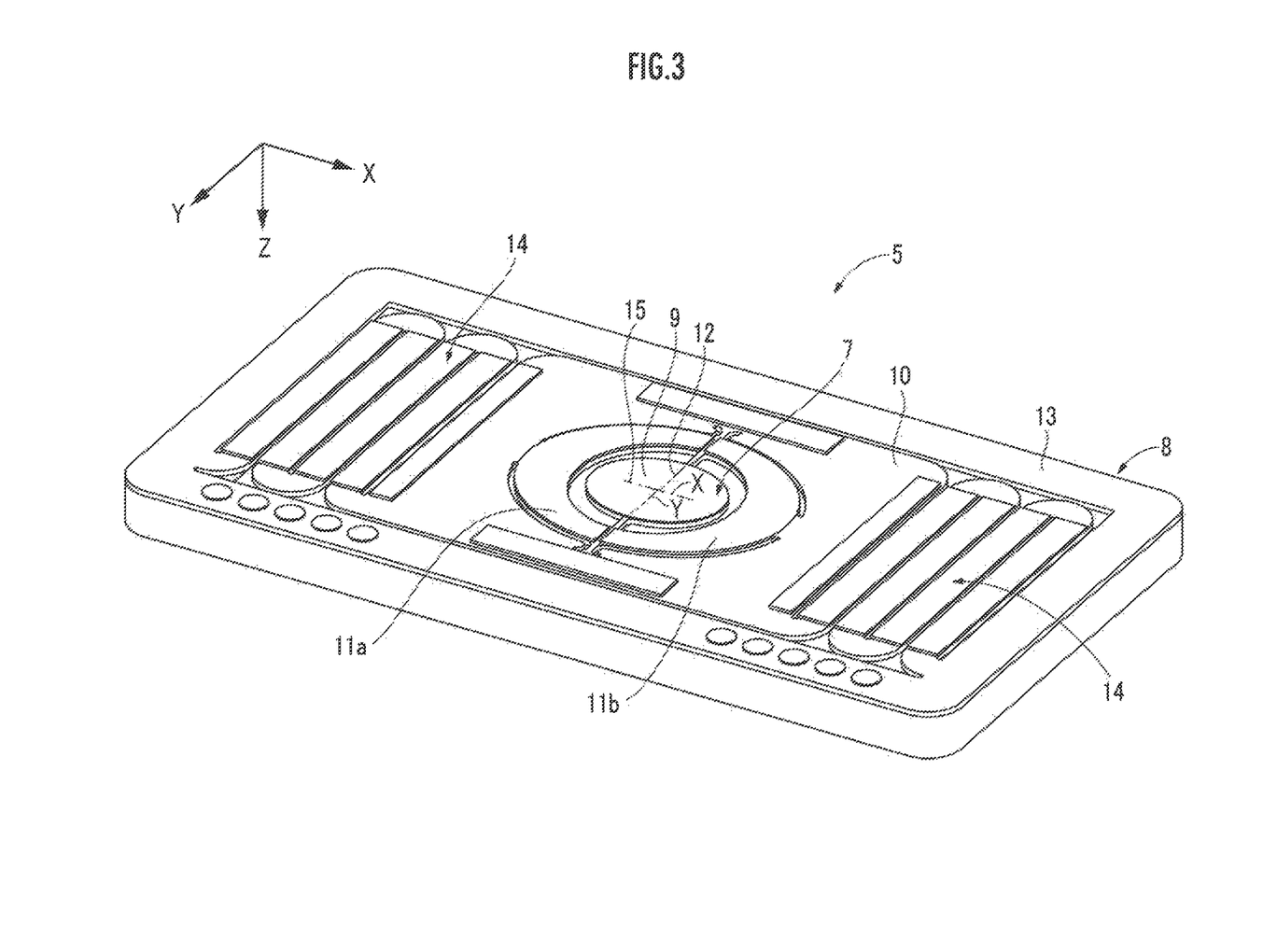
FIG. 3 is a perspective view illustrating an example of a deflector in the optical scanner illustrated in FIG. 2.

Right-handed XYZ orthogonal coordinate systems as illustrated in FIGS. 1 to 3 are used to indicate directions in the following description. The Y axis is parallel to a first rotational axial line 12 of a scanning mirror 7 described later. The X-Y plane is substantially parallel to the mirror surface of the scanning light reflection mirror 6.

FIG. 2 is a perspective view illustrating the main part of the optical scanner 3. As illustrated in FIG. 2, the scanning light moving from the scanning mirror 7 toward the scanning light reflection mirror 6 is applied in the X direction and in the Y direction by the scanning mirror 7. Thereby, the horizontal scanning and the vertical scanning of the screen 2 are performed with the scanning light reflected by the scanning light reflection mirror 6. The scanning light is able to include image information by turning on or off the output from the light source 4 so as to be adapted to the scanning speed of the scanning light from the deflector 5.

As the light source 4, for example, a light source that outputs light having coherence like a laser beam is preferably used. The light source 4 is controlled in the on-off timing in such a way that a desired pattern is projected on the screen 2 by finding a good balance between the on-off timing and the scanning speed of the output light.

The deflector 5 includes a scanning mirror 7 which reflects light from the light source and a mirror driving unit 8 which drives the scanning mirror 7. The mirror driving unit 8 is able to drive the scanning mirror 7 so as to cause a rotational simple harmonic motion by turning the scanning mirror 7 in forward and reverse directions on the basis of a supplied drive signal.

FIG. 3 illustrates an example of the deflector 5. In this deflector 5, the scanning mirror 7 has a swingable reflective surface 9 as illustrated in FIG. 3 and is driven by the mirror driving unit 8 as another portion in FIG. 3.

Specifically, the mirror driving unit 8 includes a first support unit 10 which supports the scanning mirror 7 and first piezoelectric actuators 11a and 11b each having one end coupled to the scanning mirror 7 and the other end coupled to the first support unit 10. The first piezoelectric actuators 11a and 11b are piezoelectrically driven, thereby enabling the scanning mirror 7 to be rotated around the first rotational axial line 12 with respect to the first support unit 10.

Furthermore, the mirror driving unit 8 includes a second support unit 13 which supports the first support unit 10 and a second piezoelectric actuator 14 having one end coupled to the first support unit 10 and the other end coupled to the second support unit 13. The second piezoelectric actuator 14 is piezoelectrically driven, thereby enabling the first support unit 10 to be swung around the second rotational axial line 15 with respect to the second support unit 13.

Although the deflector 5 is the same as one described in Japanese Patent Application Laid-Open No. 2013-7779, the deflector 5 is not limited thereto, but another deflector using a MEMS mirror or the like may be used.

The scanning mirror 7 reciprocatingly rotates while providing a rotational simple harmonic motion by a horizontal drive signal having a predetermined frequency such as, for example, 30 kHz, which is applied to the first piezoelectric actuators 11a and 11b of the mirror driving unit 8. As the frequency, a resonance frequency is selected so as to enable scanning with a maximum scan angle, which is as large as possible.

In this specification, the term "maximum scan angle" means an angle from one end to the other end between which scanning light from the scanning mirror 7 swings in one period of the simple harmonic motion as illustrated by an angle 2A in FIG. 5 described later.

The scanning mirror 7 reciprocatingly rotates with a vertical drive signal having a predetermined frequency such as, for example, 60 Hz, applied to the second piezoelectric actuator 14 of the mirror driving unit. Thereby, the screen 2 is scanned by scanning light at 30 kHz in the horizontal direction and at 60 Hz in the vertical direction.

Note that the maximum scan angle (maximum deflection angle) of the scanning light from the scanning mirror 7 decreases as the drive time of the scanning mirror 7 proceeds when it is driven with a drive signal of a constant intensity. For example, the maximum scan angle whose initial value is about +7.5 degrees decreases to about 6.8 degrees after the scanning mirror 7 is driven for 300 hours. Therefore, to project a desired pattern with accurate dimensions on the screen 2, the intensity of the drive signal is appropriately calibrated to prevent the maximum scan angle from decreasing.

To perform the calibration with respect to the horizontal drive signal, the optical scanner 3 includes a scanning light detecting unit 16 which detects scanning light entering the first detection position P1 and the second detection position P2 and a calibrating unit 21 (see FIG. 4) which calibrates the intensity of the horizontal drive signal supplied to the mirror driving unit 8 on the basis of a detection result obtained by the scanning light detecting unit 16. The first detection position P1 and the second detection position P2 are set on both sides of the range of the maximum scan angle of the scanning light from the scanning mirror 7.

In FIG. 1, both sides of the range of the scanning light used for the projection on the screen 2 are each indicated by an alternate long and short dash line. The first detection position P1 and the second detection position P2 are set on the outside of the range.

The scanning light detecting unit 16 includes an optical sensor 17 and a light guide unit 18 which guides scanning light to the optical sensor 17, where the scanning light, which is indicated by alternate long and two short dashes lines, impinges on the first detection position P1 and the second detection position P2. The light guide unit 18 includes a beam splitter 19 and a light guide mirror 20 respectively arranged in the first detection position P1 and the second detection position P2 and constituting a reflective surface.

The beam splitter 19 arranged in the first detection position P1 reflects the scanning light entering the first detection position P1 on the bonded surface B and guides the scanning light to the optical sensor 17. The light guide mirror 20 arranged in the second detection position P2 reflects the scanning light entering the second detection position P2 toward the optical sensor 17. The reflected scanning light goes straight in and passes through the inside of the beam splitter 19, and impinges on the optical sensor 17.

Therefore, the optical sensor 17 outputs a pulsed detection signal in response to the impinging of the scanning light on the first detection position P1 and the second detection position P2.

Figure 4:
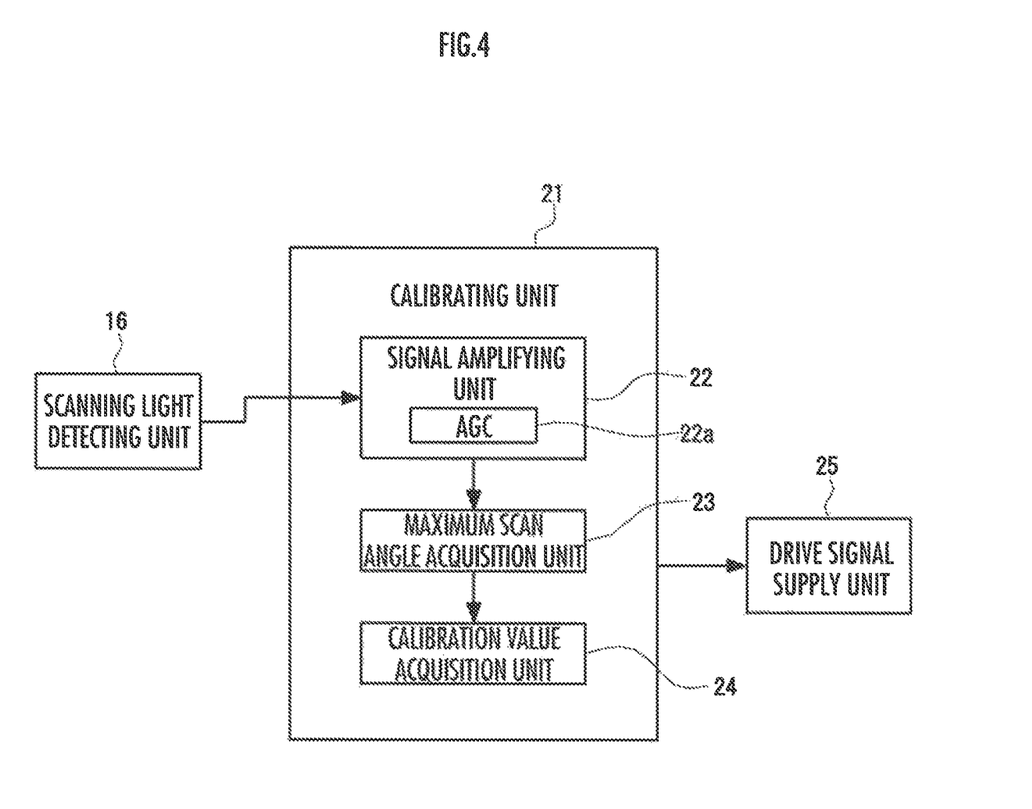
FIG. 4 is a block diagram illustrating the configuration of a calibrating unit in the optical scanner illustrated in FIG. 2.

The calibrating unit 21 calibrates the intensity of the horizontal drive signal supplied to the mirror driving unit 8 on the basis of the time point at which the scanning light detecting unit 16 detects that the scanning light entered the first detection position P1 and the second detection position P2 by the simple harmonic motion of the scanning mirror 7 caused by the horizontal drive signal and on the basis of the frequency and intensity of the horizontal drive signal.

This calibration is performed at the start of the operation of the projector 1 or at the timing of each drawing of one frame during the operation. The calibration, however, is preferably performed at the timing other than the start of driving the mirror driving unit 8 since the maximum scan angle instantaneously increases by, for example, roughly 2.8% at the start of driving the mirror driving unit 8.

FIG. 4 illustrates the configuration of the calibrating unit 21. As illustrated in FIG. 4, the calibrating unit 21 includes a signal amplifying unit 22 which amplifies a detection signal from the scanning light detecting unit 16, a maximum scan angle acquisition unit 23 which finds the maximum scan angle on the basis of the detection signal amplified by the signal amplifying unit 22, and a calibration value acquisition unit 24 which finds a calibration value of the intensity of the drive signal on the basis of the found maximum scan angle. The maximum scan angle acquisition unit 23 and the calibration value acquisition unit 24 may be each composed of a microcomputer or the like.

The signal amplifying unit 22 includes an automatic gain control (AGC) circuit 22a which adjusts a gain when acquiring an amplified signal by amplifying the pulsed detection signal sent from the optical sensor 17. This gain adjustment is performed in such a way as to acquire the peak voltage of the detection signal and to obtain a saturated amplified signal.

At the rise and fall of the saturated amplified signal, a change in time relative to a change in voltage is smaller than in the case of the detection signal, which is not saturated yet. Therefore, the time points of the rise and fall of the signal (the time points when the signal exceeds a certain level) are identified with high accuracy.

Furthermore, this gain adjustment is preferably performed so that the time required for the rise or fall of the amplified signal has a predetermined value in accordance with the time. This enables amplification in such a way that the inclinations on both sides of the waveform of the amplified signal (the degrees of steepness of the rise and fall) have predetermined values, thereby enabling an accurate identification of the time points of the rise and fall of the detection signal to be reliably performed.

The maximum scan angle acquisition unit 23 has a function of finding the maximum scan angle on the basis of the time point at which the scanning light detecting unit 16 detects that the scanning light from the scanning mirror 7 has passed through the first detection position P1 and the second detection position P2 and on the basis of the frequency of the horizontal drive signal. This detection time point is determined with high accuracy on the basis of a change in the intensity of the amplified signal generated in a saturated state by amplifying the detection signal from the optical sensor 17 in the signal amplifying unit 22.

Specifically, the rise timing, the fall timing, or the middle time point therebetween and the like of the amplified signal are adopted as the above detection time points, and the positions corresponding to the detection time points are adopted as the first detection position P1 and the second detection position P2, by which the detection time points are accurately identified.

The calibration value acquisition unit 24 finds a calibration value of the intensity of a drive signal supplied to the mirror driving unit 8 on the basis of the maximum scan angle found by the maximum scan angle acquisition unit 23 and the intensity of the horizontal drive signal used when the maximum scan angle is found. This calibration value indicates the intensity of a horizontal signal to be supplied to the first piezoelectric actuators 11a and 11b in order to maintain the maximum scan angle in the horizontal direction (X-axis direction) at an expected value.

The calibrating unit 21 instructs the drive signal supply unit 25, which supplies the drive signal to the mirror driving unit 8, to change the intensity of the horizontal drive signal to the calibration value.

Figure 5:
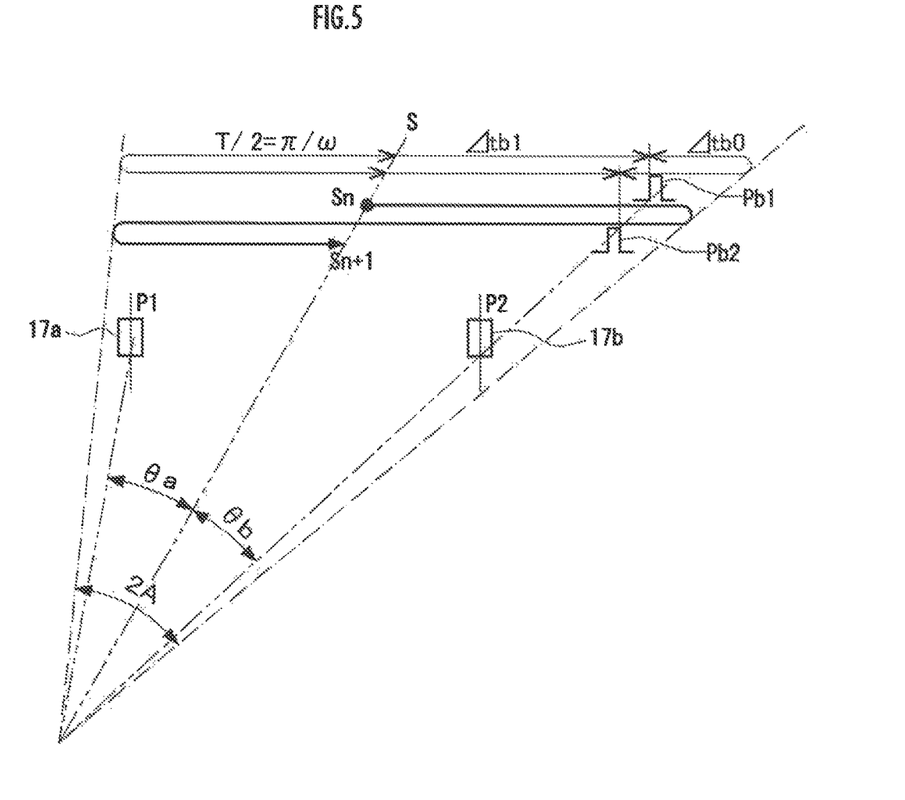
FIG. 5 is an explanatory diagram for describing a method of calculating the maximum scan angle by a maximum scan angle acquisition unit of the calibrating unit illustrated in FIG. 4.

FIG. 5 is used to describe a method of calculating the maximum scan angle by the maximum scan angle acquisition unit 23. FIG. 5 illustrates a case where optical sensors 17a and 17b are directly arranged in the first detection position P1 and the second detection position P2, respectively, without using the light guide unit 18 therebetween and the scanning light from the scanning mirror 7 directly impinges on the optical sensors 17a and 17b.

An angle between scanning light entering the scanning mirror 7 and scanning light reflected on the scanning mirror 7 is defined to be a deflection angle $\theta$ and the deflection angle $\theta$ of the scanning light is defined as zero degrees when the scanning mirror 7 is located in the neutral position. In addition, the directions of the respective positions of the optical sensors 17a and 17b represented by the deflection angle $\theta$ are defined to be angles $\theta a$ and $\theta b$, respectively.

Furthermore, the angles $\theta a$ and $\theta b$ are, as illustrated in FIG. 5, slightly smaller than a half (=A) of the maximum scan angle 2A of the scanning light. Specifically, the first detection positions P1 and the second detection position P2 are set on both sides of the range of the maximum scan angle 2A.

Assuming that a reference time point S is a time point at which the deflection angle of zero degrees is obtained for each one scanning cycle T of scanning light from the driven scanning mirror 7, the scanning light impinges on the optical sensors 17b and 17a twice for each in one scanning cycle T ranging from a certain reference time point Sn to the next reference time point Sn+1.

Figure 6:
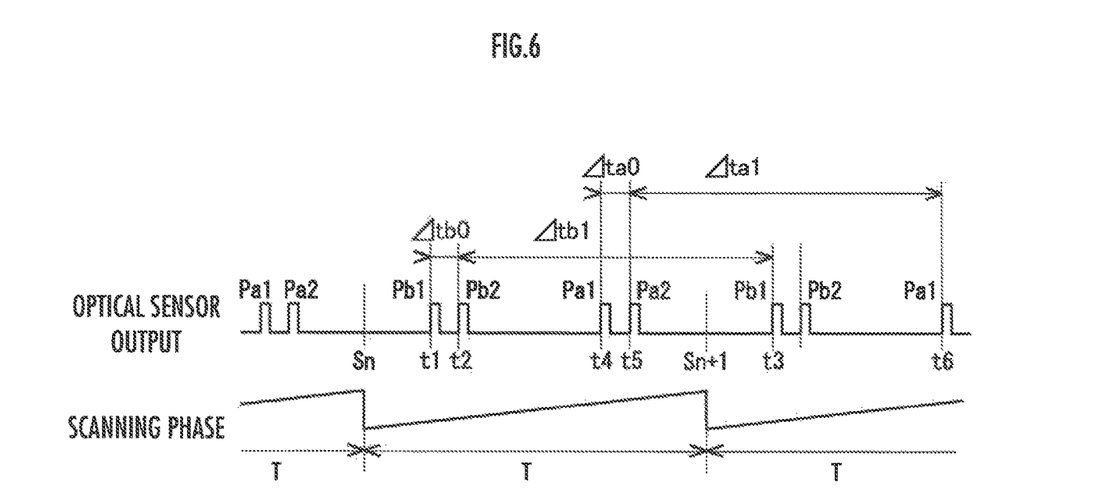
FIG. 6 is a waveform diagram illustrating a relationship between an output and a scanning phase of an optical sensor of a scanning light detecting unit in the optical scanner illustrated in FIG. 2.

FIG. 6 illustrates the above state. The horizontal axis in FIG. 6 represents a time axis. In the upper part of FIG. 6, there is illustrated a pulsed detection signal, which is output from the optical sensors 17b and 17a in response to the impinging of the scanning light. In the lower part, a scanning phase is illustrated. The scanning phase repeats a variation from zero to 360 degrees for each scanning cycle T ranging from a certain reference time point Sn to the next reference time point Sn+1.

Since scanning light impinges twice on each of the optical sensors 17b and 17a in each scanning cycle T, a pair of pulses Pb1 and Pb2 and that of pulses Pa1 and Pa2 corresponding to the respective optical sensors 17b and 17a occur. A scanning range ±A (the maximum deflection angle in one scanning cycle T) of the scanning light can be found as described below on the basis of the rise timings of these pulses and the frequency $\omega$ of the horizontal drive signal. Incidentally, the area twice the size of A corresponds to the maximum scan angle.

Specifically, the scanning mirror 7 performs a simple harmonic motion in response to the horizontal drive signal of the frequency ω. Assuming that t is an elapsed time from the reference time point S, the deflection angle θ of the scanning light is expressed by an equation θ=A sin ωt.

It is assumed that Δtb0 is a time period from a time point t1 at which the pulse Pb1 rises for the first time after passing a certain reference time point Sn to a time point t2 at which the pulse Pb2 rises next and that Δtb1 is a time period from the time point t2 to a time point t3 at which the pulse Pb rises for the first time after passing the reference time point Sn+1. Similarly, it is assumed that Δta0 is a time period from a time point t4 at which the pulse Pa1 rises for the first time (a time point at which the light impinges once) after passing the reference time point Sn to a time point t5 at which the pulse Pa2 rises next (a time point at which the light impinges again) and that Δta1 is a time period from the time point t5 to a time point t6 at which the pulse Pa1 rises again.

Since an equation "Δtb0+Δtb1=Δta0+Δta1" is equal to one scanning cycle T, the following expression is satisfied:

ω=2π/T=2π/(Δtb0+Δtb1)=2π/(Δta0+Δta1)

Furthermore, Δtb1 is a time period from the time point t2 toward the optical sensor 17a to the time point t3 at which the pulse Pb1 rises again after passing the next reference time point Sn+1. Therefore, a time period from the reference time point Sn to the center of the optical sensor 17b, in other words, a time period for scanning to the second detection position P2, in other words, a time period Δtb during which the scanning light scans the area of angle θb indicating the position of the aforementioned optical sensor 17b is expressed by the following:

$$\Delta tb = (1/2) * (\Delta tb1 - T/2)$$
$$= (1/2) * (\Delta tb1 - \pi/\omega)$$
$$= (1/4) * (\Delta tb1 - \Delta tb0)$$

where Δtb0 is a time period from the time point t1 at which the pulse Pb1 rises to the time point t2 at which the pulse Pb2 rises next, while the time period from the rise of the pulse Pb1 to the center position of the pulse Pb1 is substantially equal to a time period from the rise of the pulse Pb2 to the center of the pulse Pb2. Therefore, Δtb0 is substantially equal to a time period from the impinging of the scanning light on the second detection position P2 to the next entering the second detection position P2. This is the same as for Δtb1.

Accordingly, the following is satisfied:

θb/A=sin{ω*(¼)*(Δtb1−Δtb0)}

Similarly, the following is satisfied:

θa/A=sin{ω*(¼)*(Δta1−Δta0)}

Since θb+θa represents a value set according to the arrangement of the optical sensors 17a and 17b, the scanning range±A satisfies the following:

A=(θb+θa)/[sin{ω*(¼)*(Δtb1−Δtb0)}+sin{ω*(¼)*(Δta1−Δta0)}]

The maximum scan angle acquisition unit 23 is able to easily calculate and find the maximum scan angle (2A) by using this expression on the basis of the above time periods Δta0, Δta1, Δtb0, and Δtb1, angle (θa+θb), and frequency ω.

In the configuration of this embodiment, the scanning light from the light source 4 is reflected by the scanning mirror 7 of the deflector 5 and is further reflected by the scanning light reflection mirror 6 and then impinges on the screen 2. During the time, the scanning mirror 7 performs a simple harmonic motion around the first rotational axial line 12 on the basis of a horizontal drive signal having a frequency (horizontal scanning frequency) of about 30 kHz, for example, which is applied to the first piezoelectric actuators 11a and 11b by the drive signal supply unit 25.

Specifically, the optical scanner 3 performs scanning with scanning light of the horizontal scanning frequency. As the horizontal scanning frequency, a vibration-type resonance frequency is selected so as to obtain a maximum scan angle, which is as large as possible. The intensity of the horizontal drive signal is set so as to obtain the scanning range±A in the horizontal direction including the first detection position P1 and the second detection position P2.

Furthermore, concurrently with this, the scanning mirror 7 is driven so that the deflection angle of the scanning light is proportional to the signal intensity (linear mode) on the basis of a vertical drive signal having a vertical scanning frequency of about 60 Hz, for example, which is applied to the second piezoelectric actuator 14 by the drive signal supply unit 25. The scanning mirror 7 may be driven so as to perform a simple harmonic motion around the second rotational axial line 15.

The scanning light output from the light source 4 is turned on or off (modulated) at a timing synchronized with the aforementioned horizontal frequency and vertical frequency. Thereby, drawing according to the modulation is performed on the screen 2.

As described above, however, the maximum scan angle of the scanning light formed by the scanning mirror 7 decreases as the drive time of the scanning mirror 7 proceeds. Therefore, the intensity of the horizontal drive signal is calibrated so that a pattern having accurate dimensions is projected on the screen 2 at the start of the operation of the projector 1 or at each calibration for each drawing of one frame or the like.

Specifically, at each calibration, the maximum scan angle acquisition unit 23 of the calibrating unit 21 acquires the maximum scan angle 2A as described above on the basis of the time points t1 to t6 at which the scanning light detecting unit 16 detects that scanning light entered the optical sensors 17a and 17b. The calibration value acquisition unit 24 of the calibrating unit 21 acquires the calibration value of the intensity of the horizontal drive signal on the basis of the acquired maximum scan angle 2A.

The acquisition of the calibration value can be performed as described below, for example. Specifically, the intensity of the horizontal drive signal and the calibration values of the intensities of the horizontal drive signal corresponding to various values of the maximum scan angle 2A are previously acquired as an intensity-to-maximum scan angle correspondence table. At the calibration, the calibration value of the horizontal drive signal corresponding to the obtained maximum scan angle 2A is then acquired with reference to the table.

The calibrating unit 21 notifies the drive signal supply unit 25 of the acquired calibration value. The drive signal supply unit 25 changes the set value of the intensity of the horizontal drive signal to be supplied to the mirror driving unit 8 to the calibration value notified of. This completes the calibration of the intensity of the horizontal drive signal.

The vertical scanning is not performed at the resonance frequency, but is performed in such a way that the deflection angle of the scanning light changes linearly to the intensity of the vertical drive signal as described above. With respect to the intensity of the vertical drive signal, however, a sine wave may be used as the drive signal for calibration and the scanning mirror 7 may be caused to perform a simple harmonic motion in order to enable the calibration performed similarly to the horizontal drive signal.

As described above, according to this embodiment, the hardware configuration does not require a light source for a servo and a reverse side mirror as has been conventional, but the intensity of the drive signal can be calibrated only by the provision of a scanning light detecting unit which detects scanning light passing through the first and second detection positions. Therefore, a calibration system of an optical scanner is able to be easily configured while avoiding the performance degradation and complication of the optical scanner and an increase in power consumption.

Furthermore since the rise or fall timing of the detection signal is acquired on the basis of an amplified signal generated by amplifying the detection signal from the optical sensor 17 so as to be saturated, the rise or fall timing can be determined more accurately than in the case of an unsaturated detection signal. Thereby, the calibration accuracy of the drive signal is able to be improved.

Moreover, the gain for amplifying the detection signal is adjusted according to the rise or fall time, thereby enabling the rise or fall time of the amplified signal to be more appropriate. Thereby, accurate identification of the time points at which the scanning light impinges on the first and second detection positions can be reliably performed, which improves the accuracy of the calibration of the drive signal without fail.

Figure 7:
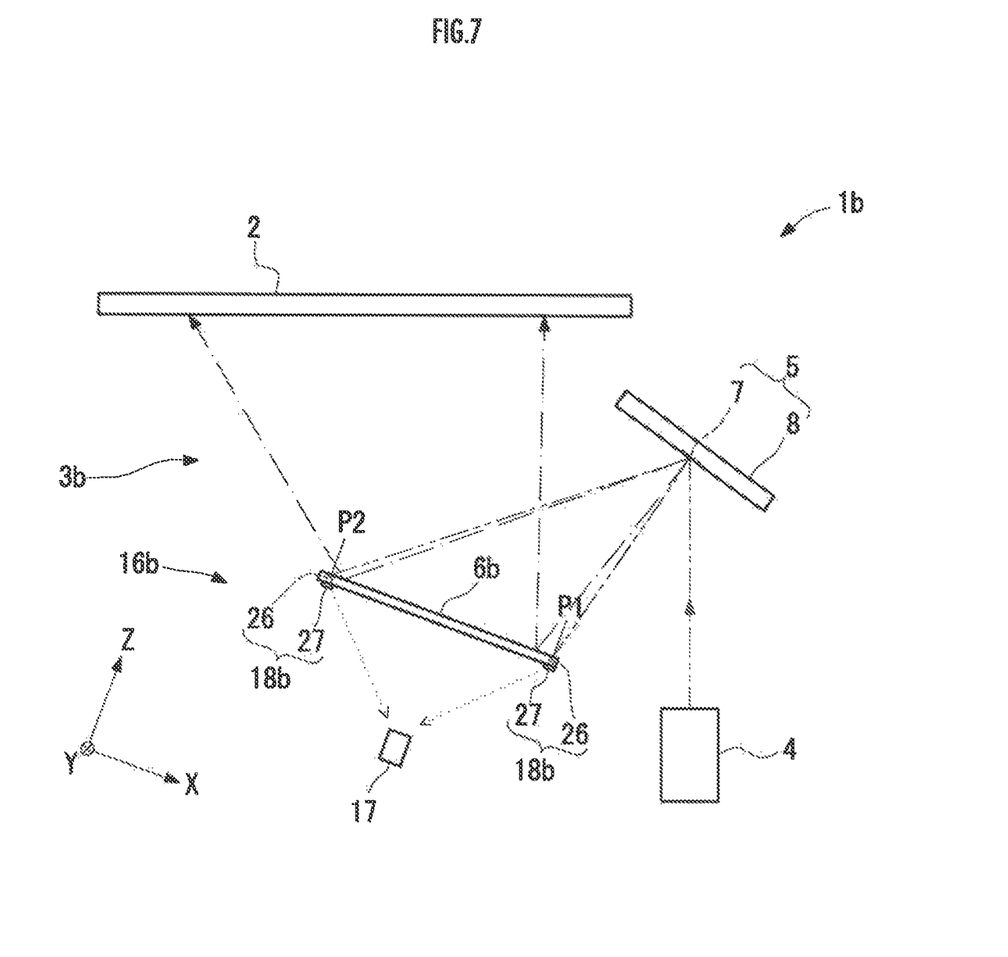
FIG. 7 is a side view illustrating the main part of an optical scanner according to another embodiment of the present invention.

FIG. 7 illustrates the main part of a projector including an optical scanner according to another embodiment of the present invention. A light guide unit 18b of the projector 1b includes a slit 26 provided in each of the first detection position P1 and the second detection position P2 set on the scanning light reflection mirror 6b and an optical element guiding scanning light from the scanning mirror 7 entering each slit 26 to the optical sensor 17. The optical sensor 17 is provided in a position apart to some extent from the scanning light reflection mirror 6 in the backside direction thereof.

As the optical element guiding the scanning light to the optical sensor 17, a diffuser 27 is used here, where the diffuser 27 is provided on the rear surface side of each slit 26 of the scanning light reflection mirror 6b. The optical element, may be formed of a reflective element or of a transmissive element.

The provision of each slit 26 and diffuser 27 so as to be vertically long in association with the range of the vertical scanning enables the maximum scan angle in the horizontal scanning to be found at any time point during the scanning interval of one frame. Other configurations and operations are the same as those in the embodiments illustrated in FIGS. 1 to 6.

According to this embodiment, scanning light entering the first detection position P1 and the second detection position P2 is able to be detected by utilizing the space on the back side of the scanning light reflection mirror 6.

Although the embodiments of the present invention have been described hereinabove, the present invention is not limited thereto. For example, the optical scanner of the present invention is not limited to a projector, but is also applicable to a head-mounted display, a head lamp, a scanning-type distance measuring device, or the like.

Furthermore, the scanning light reflection mirror need not be provided, but a correction lens may be used instead of the correction mirror as the scanning light reflection mirror. In the case of not providing the scanning light reflection mirror, a frame-shaped holding member for holding the reflective surface or the slits constituting the light guide unit can be used without preventing the scanning light directly radiated from the scanning mirror to the screen in the first and second detection positions set between the scanning mirror and the screen.

Furthermore, the maximum scan angle need not be calculated, but may be acquired on the basis of a correspondence table of: the detection time point of scanning light by the scanning light detecting unit, which has been previously obtained by the calculation; the frequency of a drive signal at the detection time point; and the maximum scan angle.

DESCRIPTION OF THE REFERENCE NUMERALS

1, 1b Projector
2 Screen
3, 3b Optical scanner
4 Light source
5 Deflector
6, 6b Scanning light reflection mirror
7 Scanning mirror
8 Mirror driving unit
9 Swingable reflective surface
10 First support unit
11a, 11b First piezoelectric actuator
12 First rotational axial line
13 Second support unit
14 Second piezoelectric actuator
15 Second rotational axial line
16, 16b Scanning light detecting unit
17, 17a, 17b Optical sensor
18, 18b Light guide unit
19 Beam splitter
20 Light guide mirror
21 Calibrating unit
22 Signal amplifying unit
22a AGC
23 Maximum scan angle acquisition unit
24 Calibration value acquisition unit
25 Drive signal supply unit
26 Slit
27 Diffuser
P1 First detection position
P2 Second detection position

What is claimed is:

1. An optical scanner, comprising:
a light source;
a scanning mirror which reflects and scans light from the light source;
a mirror driving unit which is able to drive the scanning mirror so as to perform a rotational simple harmonic motion based on a supplied drive signal;
a scanning light detecting unit which detects scanning light entering a first detection position and a second detection position set on both sides within a range of a maximum scan angle of the scanning light from the scanning mirror; and
a calibrating unit which calibrates intensity of the drive signal applied to the mirror driving unit based on a time point, at which the scanning light detecting unit detects that the scanning light from the scanning mirror has entered the first detection position and the second detection position due to the simple harmonic motion of the scanning mirror caused by the drive signal, and the frequency and intensity of the drive signal.

2. The optical scanner according to claim 1, wherein:
the scanning light detecting unit includes an optical sensor which detects the scanning light entering the first detection position and the second detection position; and
the calibrating unit generates an amplified signal by amplifying a detection signal from the optical sensor so as to be in a saturated state and determines the time point, at which the scanning light detecting unit detects that the scanning light entered the first detection position or the second detection position, based on a change in intensity of the amplified signal.

3. The optical scanner according to claim 2, wherein the calibrating unit adjusts a gain for amplifying the detection signal according to rise or fall time of the amplified signal.

4. The optical scanner according to claim 1, wherein the calibrating unit includes;
a maximum scan angle acquisition unit which acquires the maximum scan angle based on the time point at which the scanning light detecting unit detects and the frequency of the drive signal at the detected time point; and
a calibration value acquisition unit which obtains a calibration value of the intensity of the drive signal applied to the mirror driving unit based on the maximum scan angle acquired by the maximum scan angle acquisition unit and the intensity of the drive signal at the detected time point.

5. The optical scanner according to claim 4, wherein the maximum scan angle acquisition unit acquires the maximum scan angle (2A) based on:
a time period $\Delta ta0$ from a time point t4 at which the scanning light entered the first detection position once to a time point t5 at which the scanning light entered the first detection position again and a time period $\Delta ta1$ from the time point t5 at which the scanning light entered the first detection position again to a time point t6 at which the scanning light entered the first detection position further again;
a time period $\Delta tb0$ from a time point t1 at which the scanning light entered the second detection position once to a time point t2 at which the scanning light entered the second detection position again and a time period $\Delta tb1$ from the time point t2 at which the scanning light entered the second detection position again to a time point t3 at which the scanning light entered the second detection position further again;
an angle ($\theta a+\theta b$) formed between the scanning light entering the first detection position and the scanning light entering the second detection position; and
a frequency $\omega$ of the drive signal.

6. The optical scanner according to claim 1, wherein the scanning light detecting unit includes:
an optical sensor; and
a light guide unit which guides the scanning light entering the first detection position and the second detection position to the optical sensor.

7. The optical scanner according to claim 6, wherein the light guide unit is arranged at the first detection position and in the second detection position and has a reflective surface on which the scanning light from the scanning mirror is reflected toward the optical sensor.

8. The optical scanner according to claim 6, wherein the light guide unit includes:
a slit provided at each of the first detection position and in the second detection position; and
an optical element which guides the scanning light entering from the scanning mirror on each slit to the optical sensor.

9. The optical scanner according to claim 8, further comprising a scanning light reflection mirror which reflects the scanning light from the scanning mirror, wherein each slit is provided in the scanning light reflection mirror.

10. The optical scanner according to claim 9, wherein the scanning light reflection mirror is a curved mirror formed of a curved surface or a scanning light reflection mirror which corrects a distortion of the scanning light.

\* \* \* \* \*